United States Patent
Ridouane et al.

(10) Patent No.: US 12,431,513 B2
(45) Date of Patent: Sep. 30, 2025

(54) POWER GENERATION SYSTEM

(71) Applicant: Hamilton Sundstrand Corporation, Charlotte, NC (US)

(72) Inventors: El Hassan Ridouane, County Cork (IE); Changmin Cao, Cork City (IE); Herol Dsouza, Cork City (IE); Grzegorz Kruczek, Gliwice (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/638,992

(22) Filed: Apr. 18, 2024

(65) Prior Publication Data
US 2024/0363874 A1  Oct. 31, 2024

(30) Foreign Application Priority Data
Apr. 26, 2023 (EP) .................... 23461566

(51) Int. Cl.
| | |
|---|---|
| *H01M 8/04029* | (2016.01) |
| *B64D 41/00* | (2006.01) |
| *F02C 6/20* | (2006.01) |
| *H01M 8/04014* | (2016.01) |
| *H01M 8/04111* | (2016.01) |

(52) U.S. Cl.
CPC ........ *H01M 8/04029* (2013.01); *B64D 41/00* (2013.01); *F02C 6/20* (2013.01);
(Continued)

(58) Field of Classification Search
CPC ......... H01M 8/04007; H01M 8/04014; H01M 8/04029; H01M 8/04059; H01M 8/04111;
(Continued)

(56) References Cited

U.S. PATENT DOCUMENTS 4,494,372 A * 1/1985 Cronin ................ F02C 7/32
                                                              60/785
7,067,211 B2   6/2006 Lee et al.
(Continued)

FOREIGN PATENT DOCUMENTS

| CN | 213298067 U | 5/2021 |
| KR | 20220163140 A | 12/2022 |
| WO | 2022207364 A1 | 10/2022 |

OTHER PUBLICATIONS

Abstract for CN213298067 (U), Published: May 28, 2021, 1 page.
(Continued)

*Primary Examiner* — Loren C Edwards
(74) *Attorney, Agent, or Firm* — CANTOR COLBURN LLP

(57) ABSTRACT

A power generation system for an includes: a hydrogen fuel cell; an air supply system configured to supply air to the aircraft, the air supply system comprising an ORC-air heat exchanger; and an organic Rankine cycle (ORC) system comprising an organic fluid circuit. The organic fluid circuit is configured to receive excess fuel cell heat from the hydrogen fuel cell to heat organic fluid in the organic fluid circuit. The organic fluid circuit passes through the ORC-air heat exchanger such that the supply air heats the organic fluid in the organic fluid circuit. The ORC system is configured to extract power from the organic fluid.

12 Claims, 1 Drawing Sheet

(52) U.S. Cl.
CPC .... *H01M 8/04014* (2013.01); *H01M 8/04111* (2013.01); *B64D 2041/005* (2013.01); *H01M 2250/20* (2013.01)

(58) Field of Classification Search
CPC ........ H01M 2250/20; H01M 2250/407; B64D 41/00; B64D 2041/005; B64D 27/02; F02C 6/20
See application file for complete search history.

(56) References Cited

U.S. PATENT DOCUMENTS

| | | |
|---|---|---|
| 7,428,816 B2 | 9/2008 | Singh et al. |
| 8,841,041 B2 | 9/2014 | Biederman et al. |
| 11,489,176 B2 | 11/2022 | Tauveron et al. |
| 2010/0263380 A1 | 10/2010 | Biederman et al. |
| 2010/0285381 A1* | 11/2010 | Biederman ........ H01M 8/04111 429/437 |
| 2020/0355117 A1 | 11/2020 | Miftakhov |
| 2021/0167405 A1 | 6/2021 | Tauveron et al. |
| 2023/0120297 A1* | 4/2023 | Butler ................... B64D 33/08 290/52 |

OTHER PUBLICATIONS

Abstract for KR20220163140 (A), Published: Dec. 9, 2022, 1 page.
European Search Report Application No. 23461566.4 for Nov. 22, 2023, 6 pages.
Federico Ghirardo et al. "Heat recovery options for onboard fuel cell systems", International journal of Hydrogen Energy, vol. 36, No. 13, Jan. 19, 2011, pp. 8134-8142.

* cited by examiner

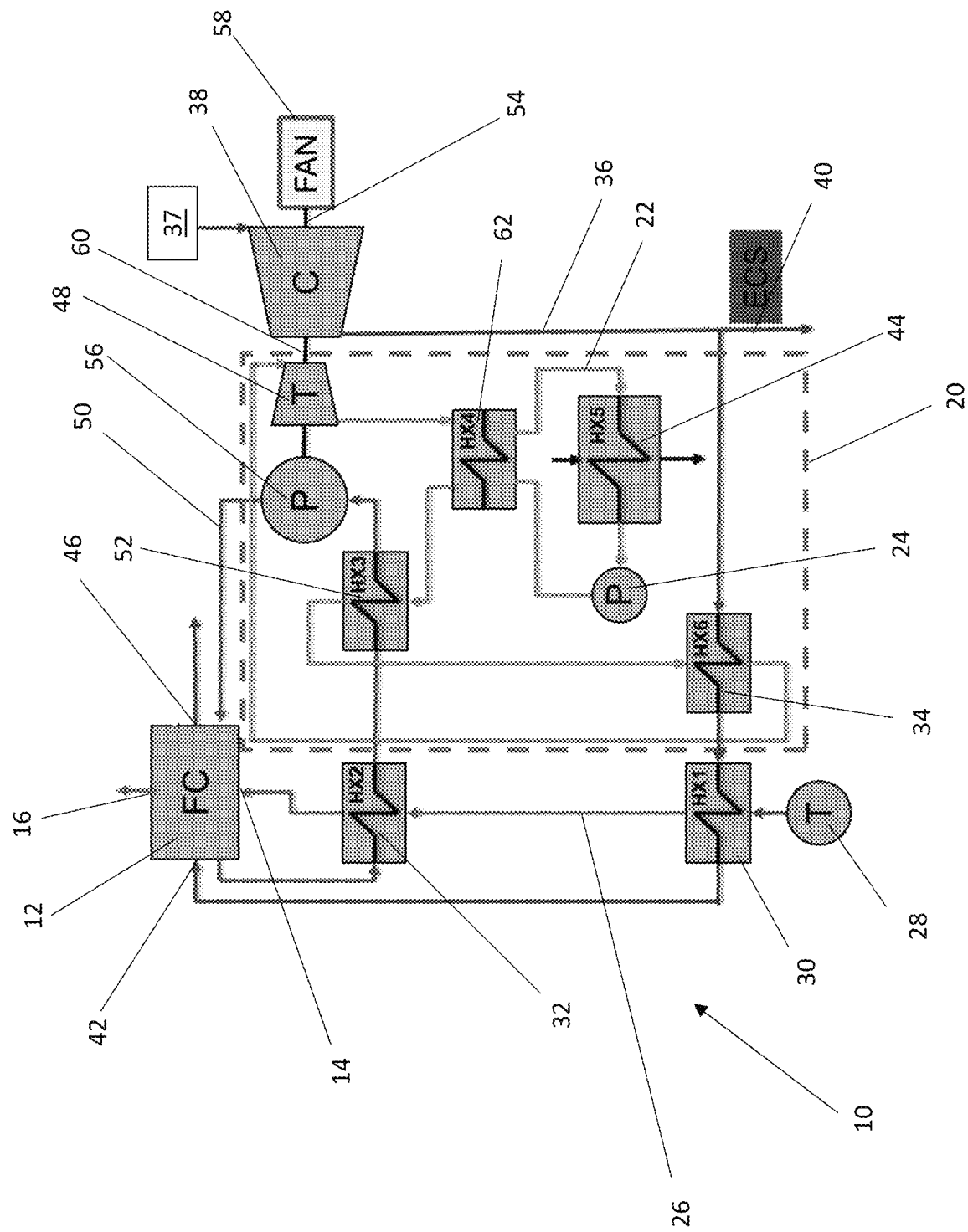

POWER GENERATION SYSTEM

CROSS REFERENCE TO RELATED APPLICATIONS

This application claims priority to European Patent Application No. 23461566.4 filed Apr. 26, 2023, the entire contents of which is incorporated herein by reference.

FIELD OF THE INVENTION

This application relates to a power generation system for an aircraft, an aircraft and a method.

BACKGROUND

In order to reduce aircraft emissions hydrogen fuel cells are used increasingly to generate energy for aircraft electrical power consuming devices. It is desirable to increase the energy efficiency of hydrogen fuel cells and their supporting systems.

SUMMARY

In a first aspect of the invention, there is provided a power generation system for an aircraft, the power generation system comprising: a hydrogen fuel cell; an air supply system configured to supply air to the aircraft, the air supply system comprising an ORC-air heat exchanger; and an organic Rankine cycle (ORC) system comprising an organic fluid circuit, wherein the organic fluid circuit is configured to receive excess fuel cell heat from the hydrogen fuel cell to heat organic fluid in the organic fluid circuit, wherein the organic fluid circuit passes through the ORC-air heat exchanger such that the supply air heats the organic fluid in the organic fluid circuit, wherein the ORC system is configured to extract power from the organic fluid.

Using an ORC system in this way permits excess fuel cell heat to be recovered. By heating the organic fluid further with supply air, the efficiency of the system may be further improved.

In an example, the power generation system comprises a coolant system configured to cool the hydrogen fuel cell, the coolant system comprising an ORC-coolant heat exchanger configured to transfer the excess fuel cell heat from coolant in the coolant system to the organic fluid.

In an example, the ORC-coolant heat exchanger is downstream of the ORC-air heat exchanger in the organic fluid circuit.

In an example, the air supply system is configured to supply the air to the hydrogen fuel cell.

In an example, the air supply system is configured to cool the air in the ORC-air heat exchanger before supplying the air to the hydrogen fuel cell.

In an example, the air supply system is configured to supply the air to an environmental conditioning system (ECS).

In an example, the power generation system comprises a hydrogen supply system, the hydrogen supply system configured to supply hydrogen to the hydrogen fuel cell.

In an example, the hydrogen supply system comprises a hydrogen-air heat exchanger.

In an example, the air supply system is configured to pass air through the hydrogen-air heat exchanger to heat the hydrogen.

In an example, the hydrogen-air heat exchanger is downstream of the ORC-air heat exchanger in the air supply system.

In an example, the hydrogen supply system comprises a hydrogen-coolant heat exchanger.

In an example, the coolant system is configured to pass coolant through the hydrogen-air heat exchanger to heat the hydrogen.

In an example, the ORC-coolant heat exchanger is downstream of the hydrogen-coolant heat exchanger in the coolant system.

In an example, the ORC system comprises a turbine, the turbine configured to extract energy from the organic fluid to drive a shaft.

In an example, the air supply system comprises a compressor, the compressor configured to compress the air, the compressor configured to receive work from the shaft.

In an example, the coolant system comprises a pump, the pump configured to pump coolant, the pump configured to receive work from the shaft.

According to a second aspect, there is provided an aircraft comprising the power generation system.

According to a third aspect, there is provided a method of generating power in an aircraft, the method comprising: removing excess fuel cell heat from a hydrogen fuel cell; transferring the excess fuel cell heat to an organic fluid; transferring heat from an air supply system to the organic fluid; and extracting power from the organic fluid in an organic Rankine cycle.

The aircraft of the second aspect may comprise any of the features described with respect to the first aspect. The method of the third aspect may include any functional steps described in relation to the first and/or second aspects.

BRIEF DESCRIPTION OF THE DRAWINGS

Various examples will now be described with reference to the accompanying drawings in which:

The FIGURE shows a process flow diagram of a process system for an aircraft.

DETAILED DESCRIPTION

The FIGURE shows a power generation system 10 for an aircraft (not shown). The power generation system 10 comprises a hydrogen fuel cell 12. The hydrogen fuel cell 12 comprises a fuel cell hydrogen inlet 14 and a fuel cell hydrogen outlet 16.

The power generation system 10 comprises a hydrogen supply system 26. The hydrogen supply system 26 comprises a hydrogen tank 28, an air-fuel heat exchanger 30 and a coolant-hydrogen heat exchanger 32. The hydrogen supply system 26 passes through the air-fuel heat exchanger 30 and the coolant-hydrogen heat exchanger 32 before reaching the fuel cell hydrogen inlet 14. The hydrogen tank 28 is configured to store liquid hydrogen.

The power generation system 10 comprises an air supply system 36. The air supply system 36 comprises an air supply 37, a compressor 38 and an environmental control system outlet 40. The air supply system 36 connects to a fuel cell air inlet 42 of the fuel cell 12. The air supply 37 may be configured to provide ram air and/or engine bleed air. The fuel cell comprises a fuel cell air outlet 46.

The power generation system 10 comprises a coolant system 50. The coolant system 50 is configured to recirculate coolant through the fuel cell 12. The coolant system 50 comprises an ORC-coolant heat exchanger 52. The coolant system 50 is configured to pass coolant through the ORC-coolant heat exchanger 52. The coolant system 50 is configured to pass coolant through the coolant-hydrogen heater exchanger 32. The coolant system 50 comprises a pump 56. The pump 56 is configured to pump the coolant around the coolant system 50.

The power generation system 10 comprises an organic Rankine cycle (ORC) system 20. The ORC system 20 comprises an organic fluid circuit 22. The ORC system comprises an ORC pump 24 configured to pump organic fluid around the organic fluid circuit 22.

The organic fluid is selected such that it has a boiling point lower than the temperature of coolant. The organic fluid is selected such that it has a condensation point greater than the ambient temperature. The organic fluid has a boiling point less than 100 deg C. The organic fluid has a boiling point less than 90 deg C. The organic fluid has a boiling point less than 80 deg C. The organic fluid has a boiling point greater than 50 deg C. The organic fluid has a boiling point greater than 60 deg C. The organic fluid has a boiling point greater than 70 deg C. In the present example the organic fluid is R245fa refrigerant. Different organic fluids may be used in other examples.

The ORC system 20 comprises an ORC-air heat exchanger 34. The organic fluid circuit 22 passes through the ORC-air heat exchanger 34. The air supply system 36 is configured to pass the air through the ORC-air heat exchanger 34.

The ORC system 20 comprises an exhaust heat exchanger 44. The organic fluid circuit 22 passes through the exhaust heat exchanger 44. The exhaust heat exchanger 44 is configured to pass heat from organic fluid in the organic fluid circuit 22 outside the aircraft.

The ORC system comprises the ORC-coolant heat exchanger 52. The organic fluid circuit 22 passes through the ORC-coolant heat exchanger 52.

The ORC system comprises a recovery heat exchanger 62. The organic fluid circuit 22 passes through the recovery heat exchanger 62 twice, such that heat can be recovered from hotter organic fluid (upstream of the exhaust heat exchanger 44) to cooler organic fluid (downstream of the exhaust heat exchanger 44).

The ORC system 20 comprises a turbine 48. The organic fluid circuit 22 passes through the turbine 48. The turbine 48 is downstream of the ORC-coolant heat exchanger 52 in the organic fluid circuit 22. The turbine 48 is downstream of the ORC-air heat exchanger in the organic fluid circuit 22. The ORC-coolant heat exchanger 52 is upstream of the ORC-air heat exchanger 34 in the organic fluid circuit 22.

The power generation system comprises a drive system 54. The drive system 54 comprises a fan or propeller 58 and a mechanical linkage 60. The mechanical linkage 60 mechanically links the pump 50 to the fan 58. The mechanical linkage 60 further mechanically links the turbine 48 to the pump 56 and the propeller 58. The mechanical linkage 60 further mechanically links the compressor 38 to the pump 56, the compressor 38, the turbine 48 and the fan 58. The mechanical linkage 60 comprises a shaft.

In use, the hydrogen supply 26 passes hydrogen (initially liquid hydrogen as stored in the hydrogen tank 28) from the hydrogen tank 28 through the air-fuel heat exchanger 30, where the hydrogen is heated. The hydrogen supply 26 then passes the hydrogen through the coolant-hydrogen heat exchanger 32, where the hydrogen is heated. The hydrogen supply 26 then passes hydrogen (now a gas) to the fuel cell hydrogen inlet 14.

The air supply system 36 passes air from the air supply 37 to the compressor 38. The compressor 38 compresses the air. A portion of the air is then sent to the environmental control system outlet 40. The air supply system 36 passes the remaining air (i.e. that which does not go to the environmental control system via the environmental control system outlet 40) to the ORC-air heat exchanger 34. The air is cooled in the ORC-air heat exchanger.

After the ORC-air heat exchanger 34, the air supply system 36 passes the air to the air-fuel heat exchanger 30. In the air-fuel heat exchanger 30, the air passes heat to the hydrogen. The air is cooled in the air-fuel heat exchanger 30. The air supply system 36 then passes the air to the fuel cell air inlet 42.

The hydrogen fuel cell 12 chemically converts the hydrogen and air into water, generating electricity. Some hydrogen is not consumed by the hydrogen fuel cell 12 and as a result the fuel cell outputs excess hydrogen via the fuel cell hydrogen outlet 16. The hydrogen fuel cell 12 outputs air via the fuel cell air outlet 46.

The hydrogen fuel cell 12 powers the pump 56. The hydrogen fuel cell 12 powers other components of the aircraft, including various auxiliary systems. The hydrogen fuel cell 12 powers the compressor 38.

The coolant system 50 recirculates coolant through the fuel cell 12 to cool the fuel cell. The coolant removes heat from the hydrogen fuel cell 12. The coolant system 50 passes the coolant through the hydrogen heat exchanger 32, which passes heat from the coolant to the hydrogen in the hydrogen supply 26, thereby cooling the coolant. The coolant system 50 passes the coolant through the ORC-coolant heat exchanger 52, which further cools the coolant. The pump 56 pumps the coolant around the coolant system 50.

The ORC pump 24 pumps the organic fluid around the organic fluid circuit 22. The organic fluid circuit 22 passes the organic fluid to the ORC-coolant heat exchanger 52. In the ORC-coolant heat exchanger 52 the organic fluid receives excess fuel cell heat (i.e. heat that has been removed from the hydrogen fuel cell 12) from the coolant. The excess fuel cell heat may be a portion of the total heat removed from the hydrogen fuel cell 12. The organic fluid circuit 22 passes the organic fluid to the ORC-air heat exchanger 34. In the ORC-air heat exchanger 34 the organic fluid receives heat from the air.

The organic fluid circuit 22 passes the heated organic fluid to the turbine 48, allowing the turbine 48 to produce work. The organic fluid is a superheated gas in the turbine 48, having evaporated in the ORC-coolant heat exchanger 52 and been further superheated in the ORC-air heat exchanger 34.

After the turbine 48 the organic fluid circuit 22 passes the organic fluid to the recovery heat exchanger 62. In the recovery heat exchanger 62, heat is passed from organic fluid in a first organic fluid circuit section (downstream of the turbine) to organic fluid in a second organic fluid circuit section (upstream of the ORC-coolant heat exchanger 52 and/or ORC-air heat exchanger 34). In this way, the organic fluid in the second organic fluid circuit section is pre-heated.

After the recovery heat exchanger 62, the organic fluid enters the exhaust heat exchanger 44, where heat is passed from the organic fluid to ambient. In the present example, the organic fluid condenses in the exhaust heat exchanger 44.

After the recovery heat exchanger 62, the organic fluid enters the ORC pump 24, which pumps the organic fluid around the organic fluid circuit 22, firstly to the first organic fluid section in the recovery heat exchanger 62. The pressure of the organic fluid is dependent on the boiling point of organic fluid. The ORC pump 24 is controlled depending on the pressure of the organic fluid.

The turbine 48 contributes to rotating the compressor 37 via the mechanical linkage 60. The turbine 48 contributes to rotating the pump 56 via the mechanical linkage 60. The turbine 48 contributes to rotating the fan 58 via the mechanical linkage 60.

In other examples the coolant system 50 is omitted and the organic fluid in the ORC system 20 may cool the hydrogen fuel cell 12 directly. In such examples, the organic fluid receives the excess fuel cell heat directly from the hydrogen fuel cell 12 rather than receiving it from intermediate fluid.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A power generation system for an aircraft, the power generation system comprising:
    a hydrogen fuel cell;
    an air supply system configured to supply air to the aircraft, the air supply system comprising an ORC-air heat exchanger; and
    an organic Rankine cycle (ORC) system comprising an organic fluid circuit;
    wherein the organic fluid circuit is configured to receive excess fuel cell heat from the hydrogen fuel cell to heat organic fluid in the organic fluid circuit,
    wherein the organic fluid circuit passes through the ORC-air heat exchanger such that the supply air heats the organic fluid in the organic fluid circuit,
    wherein the ORC system is configured to extract power from the organic fluid;
    the power generation system further comprising:
    a hydrogen supply system, the hydrogen supply system configured to supply hydrogen to the hydrogen fuel cell;
    wherein the hydrogen supply system comprises a hydrogen-air heat exchanger, wherein the air supply system is configured to pass air through the hydrogen-air heat exchanger to heat the hydrogen,
    wherein the hydrogen-air heat exchanger is downstream of the ORC-air heat exchanger in the air supply system.

2. The power generation system according claim 1, further comprising:
    a coolant system configured to cool the hydrogen fuel cell, the coolant system comprising an ORC-coolant heat exchanger configured to transfer the excess fuel cell heat from coolant in the coolant system to the organic fluid.

3. The power generation system according claim 1, wherein an ORC-coolant heat exchanger is upstream of the ORC-air heat exchanger in the organic fluid circuit.

4. The power generation system according claim 1, wherein the air supply system is configured to supply the air to the hydrogen fuel cell.

5. The power generation system according to claim 4, wherein the air supply system is configured to cool the air in the ORC-air heat exchanger before supplying the air to the hydrogen fuel cell.

6. The power generation system according claim 1, wherein the air supply system is configured to supply the air to an environmental conditioning system (ECS).

7. The power generation system according to claim 1, further comprising:
    a coolant system configured to cool the hydrogen fuel cell, the coolant system comprising an ORC-coolant heat exchanger configured to transfer the excess fuel cell heat from coolant in the coolant system to the organic fluid;
    wherein the hydrogen supply system comprises a hydrogen-coolant heat exchanger, wherein the coolant system is configured to pass the coolant through the hydrogen-air heat exchanger to heat the hydrogen.

8. The power generation system according to claim 7, wherein the ORC-coolant heat exchanger is downstream of the hydrogen-coolant heat exchanger in the coolant system.

9. The power generation system according claim 1, wherein the ORC system comprises a turbine, the turbine configured to extract energy from the organic fluid to drive a shaft.

10. The power generation system according to claim 9, wherein:
    the air supply system comprises a compressor, the compressor configured to compress the air, the compressor configured to receive work from the shaft; and/or
    the coolant system comprises a pump, the pump configured to pump coolant, the pump configured to receive work from the shaft.

11. An aircraft comprising: the power generation system according to claim 1.

12. A method of generating power in an aircraft utilizing the power generation system of claim 1, the method comprising:
    removing the excess fuel cell heat from the hydrogen fuel cell;
    transferring the excess fuel cell heat to the organic fluid;
    transferring heat from the air supply system to the organic fluid; and
    extracting the power from the organic fluid in the organic Rankine cycle.

* * * * *